(12) United States Patent
Fischer et al.

(10) Patent No.: US 9,215,760 B2
(45) Date of Patent: Dec. 15, 2015

(54) TRANSPARENT PANE WITH ELECTRICALLY CONDUCTIVE COATING

(71) Applicant: SAINT-GOBAIN GLASS FRANCE, Courbevoie (FR)

(72) Inventors: Klaus Fischer, Alsdorf (DE); Sebastian Janzyk, Herzogenrath (DE); Virginie Moreau, Paris (FR); Marcus Neander, Eschweiler (DE); Christoph Schmitz, Bornheim (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/358,683

(22) PCT Filed: Oct. 4, 2012

(86) PCT No.: PCT/EP2012/069567
§ 371 (c)(1),
(2) Date: May 15, 2014

(87) PCT Pub. No.: WO2013/104439
PCT Pub. Date: Jul. 18, 2013

(65) Prior Publication Data
US 2014/0319116 A1 Oct. 30, 2014

(30) Foreign Application Priority Data
Jan. 10, 2012 (EP) .................................... 12150546

(51) Int. Cl.
*B60L 1/02* (2006.01)
*H05B 3/86* (2006.01)
(Continued)

(52) U.S. Cl.
CPC ................ *H05B 3/86* (2013.01); *H05B 3/0014* (2013.01); *H05B 3/84* (2013.01); *H05B 2203/01* (2013.01);
(Continued)

(58) Field of Classification Search
CPC C03C 17/36; C03C 17/3618; C03C 17/3644; C03C 17/3652; C03C 17/3681; C03C 17/366; G02B 1/10; H05B 3/86; H05B 3/84; H05B 3/0014; H05B 2203/01; H05B 2203/011; H05B 2203/013; H05B 2203/017; Y10T 29/49083
USPC ................ 219/202, 203, 213, 214, 218, 219; 428/623, 630, 633, 660, 673
See application file for complete search history.

(56) References Cited

U.S. PATENT DOCUMENTS

| 4,443,691 A | 4/1984 | Sauer |
| 4,902,580 A * | 2/1990 | Gillery .......................... 428/623 |

(Continued)

FOREIGN PATENT DOCUMENTS

| DE | 9313394 | 10/1993 |
| DE | 4235063 | 4/1994 |

(Continued)

OTHER PUBLICATIONS

PCT International Search Report mailed on Nov. 23, 2014 for PCT/EP2012/069566 filed on Oct. 4, 2012 in the name of Saint-Gobain Glass France.

(Continued)

*Primary Examiner* — Shawntina Fuqua
(74) *Attorney, Agent, or Firm* — Steinfl & Bruno LLP

(57) ABSTRACT

A transparent pane is described. The transparent pane has at least one transparent substrate and at least one electrically conductive coating on at least one surface of the transparent substrate. The electrically conductive coating has at least two functional layers arranged one on top of the other, and each functional layer has at least one anti-reflection layer, a first adaptation layer above the anti-reflection layer, and an electrically conductive layer above the first adaptation layer, and at least one anti-reflection layer of at least one layer of a dielectric material having an index of refraction less than 2.1 arranged between two electrically conductive layers, and a layer of an optically highly refractive material having an index of refraction greater than or equal to 2.1.

20 Claims, 5 Drawing Sheets

Figure 1:
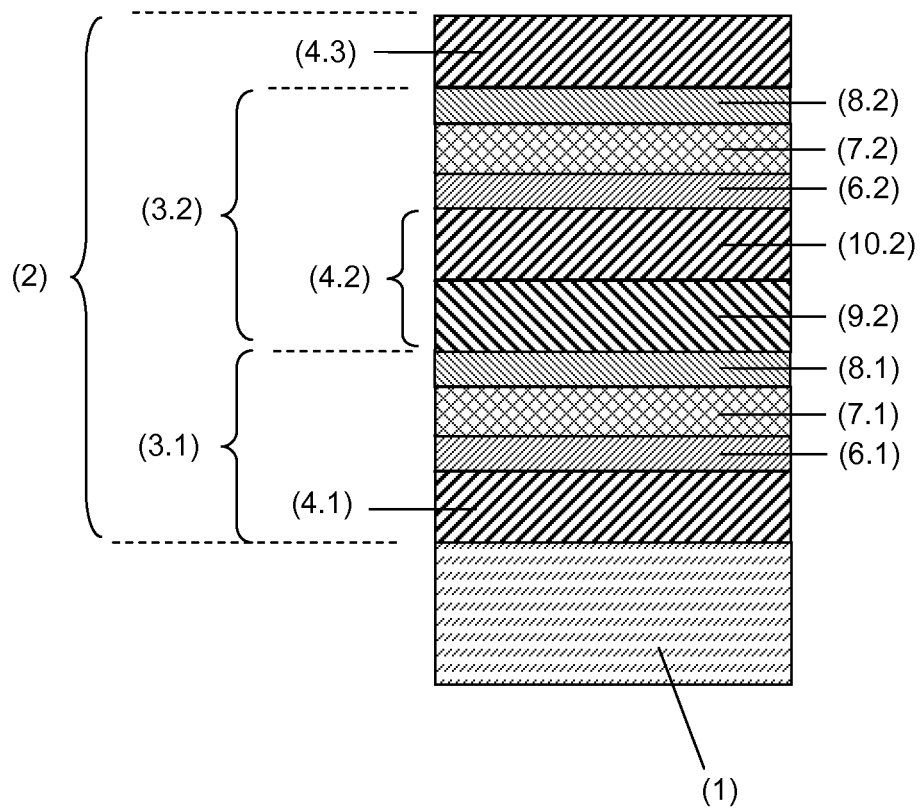

(51) Int. Cl.
  *H05B 3/84* (2006.01)
  *H05B 3/00* (2006.01)

(52) U.S. Cl.
  CPC ..... *H05B 2203/011* (2013.01); *H05B 2203/013* (2013.01); *H05B 2203/017* (2013.01); *Y10T 29/49083* (2015.01)

(56) References Cited

U.S. PATENT DOCUMENTS

| | | | |
|---|---|---|---|
| 6,045,896 | A | 4/2000 | Boire et al. |
| 6,287,675 | B1 | 9/2001 | Guiselin et al. |
| 6,541,133 | B1 | 4/2003 | Schicht et al. |
| 6,673,427 | B2 | 1/2004 | Guiselin et al. |
| 8,022,333 | B2 | 9/2011 | Maeuser |
| 2003/0186064 | A1 | 10/2003 | Murata et al. |
| 2005/0202254 | A1 | 9/2005 | Nunez-Regueiro et al. |
| 2007/0020465 | A1 | 1/2007 | Thiel et al. |
| 2007/0082219 | A1 | 4/2007 | Fleury et al. |
| 2007/0108175 | A1 | 5/2007 | Andrt |
| 2007/0188871 | A1 | 8/2007 | Fleury et al. |
| 2008/0210303 | A1 | 9/2008 | Lu et al. |
| 2008/0277320 | A1 | 11/2008 | Theil |
| 2009/0015909 | A1 | 1/2009 | Fleury et al. |
| 2009/0197077 | A1 | 8/2009 | Reutler et al. |

FOREIGN PATENT DOCUMENTS

| | | |
|---|---|---|
| DE | 19848751 | 12/1999 |
| DE | 10333618 | 3/2005 |
| DE | 10352464 | 6/2005 |
| DE | 202004019286 | 4/2006 |
| DE | 69731268 | 9/2006 |
| EP | 0025755 | 3/1981 |
| WO | 92/04185 | 3/1992 |
| WO | 03/024155 | 3/2003 |
| WO | 2007/101964 A1 | 9/2007 |
| WO | 2009/029466 | 3/2009 |

OTHER PUBLICATIONS

PCT International Search Report mailed on Nov. 23, 2014 for PCT/EP2012/069567 filed on Oct. 4, 2012 in the name of Saint-Gobain Glass France.

International Preliminary Report on Patentability issued on Jul. 15, 2014 for International Application No. PCT/EP2012/069567 filed on Oct. 4, 2012 in the name of Saint-Gobain Glass France (English Translation and German Original).

International Preliminary Report on Patentability issued on Jul. 15, 2014 for International Application No. PCT/EP2012/069566 filed on Oct. 4, 2012 in the name of Saint-Gobain Glass France (English Translation and German Original).

* cited by examiner

A - A'

TRANSPARENT PANE WITH ELECTRICALLY CONDUCTIVE COATING

CROSS REFERENCE TO RELATED APPLICATIONS

The present application is the US national stage of International Patent Application PCT/EP2012/069567 filed on Oct. 4, 2012 which, in turn, claims priority to European Patent Application EP 12150546.5 filed on Jan. 10, 2012.

The invention relates to a transparent pane with an electrically conductive coating, a method for its production, and its use.

The field of vision of a motor vehicle window, in particular a windshield, must be kept free of ice and condensation. In the case of motor vehicles with an internal combustion engine, a stream of air heated by engine heat can, for example, be directed to the windows.

Alternatively, the window can have an electrical heating function. From DE 103 52 464 A1, for example, a composite glass pane is known in which electrically heatable wires are placed between two glass panes. The specific heating output P, for example, roughly 600 W/m$^2$, can be adjusted by the ohmic resistance of the wires. Because of design and safety aspects, the number of wires as well as the diameter of the wires must be kept as small as possible. The wires must not be visible or must be hardly perceptible in daylight and at night with headlight illumination.

Also known are transparent, electrically conductive coatings, in particular based on silver. Such electrically conductive coatings can be used as coatings with reflecting properties for the infrared range or even as heatable coatings. WO 03/024155 A2 discloses, for example, an electrically conductive coating with two silver layers. Such coatings usually have sheet resistances in the range from 3 ohm/square to 5 ohm/square.

The specific heating output P of an electrically heatable coating with a sheet resistance $R_{square}$, an operating voltage U, and a distance h between two busbars can be calculated with the formula $P=U^2/(R_{square}*h^2)$. The distance h between two busbars is, in typical windshields of passenger cars, roughly 0.8 m, which corresponds approx. to the height of the pane. In order to obtain a desired specific heating output P of 600 W/m$^2$ with a sheet resistance of 4 ohm/square, an operating voltage U of roughly 40 V is necessary. Since the onboard voltage of motor vehicles is usually 14 V, a power supply or a voltage converter is necessary to generate an operating voltage of 40 V. A voltage increase from 14 V to 40 V is always associated with electrical line losses and additional costs for additional components.

US 2007/0082219 A1 and US 2007/0020465 A1 disclose transparent, electrically conductive coatings with at least three silver layers. In US 2007/0082219 A1, sheet resistances near 1 ohm/square are reported for coatings based on three silver layers. An operating voltage U=14 V, a sheet resistance $R_{square}$=1 ohm/square and a distance h=0.8 m yield a specific heating output P of roughly 300 W/m$^2$.

To provide an adequate specific heating output P, for example, roughly 500 W/m$^2$, in particular for heating relatively large panes, a further reduction of the sheet resistance of the electrically heatable coating is essential. This can be achieved with an electrically heatable coating with, typically, three silver layers by increasing the thickness of the individual silver layers. However, an excessive layer thickness of the silver layers results in inadequate optical properties of the pane, in particular with regard to transmittance and color appearance, such that legal regulations, as specified, for example, in ECE R 43 ("Uniform Provisions concerning the Approval of Safety Glazing and Composite Glass Materials"), cannot be complied with.

The adequately low sheet resistance can also be achieved through the use of four silver layers in the conductive coating, with the optical properties of the pane corresponding to the legal requirements as a result of lower layer thicknesses of the individual silver layers. However, the application of coatings with four or more layers of silver is technically complicated and costly.

The object of the present invention consists in providing a transparent pane with an improved electrically conductive coating. The electrically conductive coating should have, in particular, a lower sheet resistance $R_{square}$ compared to the prior art and, thus, have an improved specific heating output P as well as improved reflecting properties for the infrared range. The pane should have high transmittance and high color neutrality and be economically producible.

The object of the present invention is accomplished according to the invention by a transparent pane according to claim 1. Preferred embodiments emerge from the subclaims.

The transparent pane according to the invention comprises at least one transparent substrate and at least one electrically conductive coating on at least one surface of the transparent substrate, wherein
  the electrically conductive coating has at least two functional layers arranged one above another and each functional layer comprises at least
    one anti-reflection layer,
    above the anti-reflection layer, a first matching layer, and
    above the first matching layer, an electrically conductive layer, and
  at least one functional layer includes one anti-reflection layer, that comprises at least
    one layer of a dielectric material with a refractive index less than 2.1, and
    one layer of an optically highly refractive material with a refractive index greater than or equal to 2.1.

If a first layer is arranged above a second layer, this means, in the context of the invention, that the first layer is arranged farther from the transparent substrate than the second layer. If a first layer is arranged below a second layer, this means, in the context of the invention, that the second layer is arranged farther from the transparent substrate than the first layer. The uppermost functional layer is that functional layer that is at the greatest distance from the transparent substrate. The lowest layer is that functional layer that is at the least distance from the transparent substrate.

In the context of the invention, a layer can be made of one material. However, a layer can also comprise two or more individual layers of different materials. A functional layer according to the invention comprises, for example, at least one anti-reflection layer, a first and a second matching layer, and an electrically conductive layer.

If a first layer is arranged above or below a second layer, this does not necessarily mean, in the context of the invention, that the first and the second layer are in direct contact with each other. One or more other layers can be arranged between the first and the second layer, so long as this is not explicitly ruled out.

According to the invention, the electrically conductive coating is applied at least on one surface of the transparent substrate. However, both surfaces of the transparent substrate can also be provided with an electrically conductive coating according to the invention.

The electrically conductive coating can extend over the entire surface of the transparent substrate. However, alternatively, the electrically conductive coating can extend over only a part of the surface of the transparent substrate. The electrically conductive coating preferably extends over at least 50%, particularly preferably over at least 70%, and quite particularly preferably over at least 90% of the surface of the transparent substrate.

The electrically conductive coating can be applied directly on the surface of the transparent substrate. The electrically conductive coating can, alternatively, be applied on a carrier film that is adhesively bonded to the transparent substrate.

Each functional layer of the electrically conductive coating according to the invention includes an anti-reflection layer. The anti-reflection layers effect, in particular, a reduction in the reflectance and, thus, an increase in the transmittance of the coating according to the invention in the visible spectral range. At least one of these anti-reflection layers comprises according to the invention at least two layers: one layer of a dielectric material with a refractive index less than 2.1 and one layer of an optically highly refractive material with a refractive index greater than or equal to 2.1. In the context of the invention, an anti-reflection layer is arranged between two electrically conductive layers when at least one electrically conductive layer is arranged above the anti-reflection layer and when at least one electrically conductive layer is arranged below the anti-reflection layer. However, according to the invention, the anti-reflection layer does not make direct contact with the adjacent electrically conductive layers.

The values reported for refractive indices are measured at a wavelength of 550 nm.

The particular advantage of the invention resides in the configuration of at least one anti-reflection layer, which comprises, according to the invention, at least one layer of a dielectric material with a refractive index less than 2.1 and at least one layer of an optically highly refractive material with a refractive index greater than or equal to 2.1. It has surprisingly been demonstrated that such an anti-reflection layer results in a lower sheet resistance of the electrically conductive coating with, at the same time, high transmittance and high color neutrality.

Compared to the prior art, by means of the configuration according to the invention of the electrically conductive coating, the thickness of the electrically conductive layers can be reduced with unchanged sheet resistance. Thinner electrically conductive layers result in better transmittance and a more neutral coloration of the transparent pane according to the invention with an electrically conductive coating.

The transparent pane according to the invention with an electrically conductive coating preferably has a total transmittance greater than 70%. The term "total transmittance" is based on the process for testing the light permeability of motor vehicle windows specified by ECE-R 43, Annex 3, §9.1.

The electrically conductive coating of the transparent pane according to the invention preferably has a sheet resistance less than or equal to 1 ohm/square, particularly preferably preferably from 0.4 ohm/square to 0.9 ohm/square, quite particularly preferably from 0.5 ohm/square to 0.85 ohm/square, for example, roughly 0.7 ohm/square. In this range for the sheet resistance, advantageously high specific heating outputs P are achieved. Moreover, the electrically conductive coating has, in this range for the sheet resistance, particularly good reflecting properties for the infrared range.

To increase the total transmittance and/or to reduce the sheet resistance, the transparent pane with an electrically conductive coating can be subjected to a temperature treatment, for example, at a temperature from 500° C. to 700° C.

It has been demonstrated that the electrically conductive coating according to the invention can be subjected to such a temperature treatment without the coating being damaged. The transparent pane according to the invention can also be convexly or concavely bent without the coating being damaged. These are major advantages of the electrically conductive coating according to the invention.

The layer of an optically highly refractive material can be arranged above or below the layer of a dielectric material with a refractive index less than 2.1. The layer of an optically highly refractive material is preferably arranged above the layer of a dielectric material with a refractive index less than 2.1. Thus, a particularly advantageous sheet resistance of the electrically conductive coating is achieved.

The thickness of the layer of an optically highly refractive material with a refractive index greater than or equal to 2.1 is preferably from 10% to 99%, particularly preferably from 25% to 75%, quite particularly preferably from 33% to 67% of the thickness of the anti-reflection layer that contains this layer of an optically highly refractive material. This is particularly advantageous with regard to the sheet resistance of the electrically conductive coating and the optical properties as well as economical production of the transparent pane according to the invention.

In an advantageous embodiment of the invention, at least one anti-reflection layer arranged between two electrically conductive layers includes at least one layer of a dielectric material with a refractive index less than 2.1 and one layer of an optically highly refractive material with a refractive index greater than or equal to 2.1. Particularly good results are thus obtained. In the context of the invention, an anti-reflection layer is arranged between two electrically conductive layers when it is arranged between two adjacent electrically conductive layers of the layer sequence.

In a particularly advantageous embodiment of the invention, each anti-reflection layer arranged between two electrically conductive layers includes at least one one layer of a dielectric material with a refractive index less than 2.1 and one layer of an optically highly refractive material with a refractive index greater than or equal to 2.1. This is particularly advantageous with regard to the sheet resistance of the electrically conductive coating and the optical properties of the transparent pane according to the invention.

The anti-reflection layers arranged between two electrically conductive layers preferably have layer thicknesses from 35 nm to 70 nm, particularly preferably from 45 nm to 60 nm. These ranges for the layer thickness are preferred, in particular, for anti-reflection layers that include at least one layer of a dielectric material with a refractive index less than 2.1 and one layer of an optically highly refractive material with a refractive index greater than or equal to 2.1. Thus, particularly advantageous sheet resistances of the electrically conductive coating are obtained.

The layer of an optically highly refractive material preferably has a refractive index n from 2.1 to 2.5, particularly preferably from 2.1 to 2.3.

The layer of an optically highly refractive material with a refractive index greater than or equal to 2.1 preferably contains at least one mixed silicon/metal nitride, particularly preferably at least one mixed silicon/zirconium nitride. This is particularly advantageous with regard to the sheet resistance of the electrically conductive coating. The mixed silicon/zirconium nitride preferably has dopants. The layer of an optically highly refractive material can, for example, contain an aluminum-doped mixed silicon/zirconium nitride.

The mixed silicon/zirconium nitride is preferably deposited by means of magnetic field supported cathode sputtering with a target that contains from 40 wt.-% to 70 wt.-% silicon, from 30 wt.-% to 60 wt.-% zirconium, and from 0 wt.-% to 10 wt.-% aluminum as well as production-related admixtures. The target particularly preferably contains from 45 wt.-% to 60 wt.-% silicon, from 35 wt.-% to 55 wt.-% zirconium, and from 3 wt.-% to 8 wt.-% aluminum as well as production-related admixtures. The deposition of the mixed silicon/zirconium nitride preferably takes place under addition of nitrogen as reaction gas during the cathode sputtering.

However, the layer of an optically highly refractive material can also contain, for example, at least mixed silicon/aluminum nitride, mixed silicon/hafnium nitride, or mixed silicon/titanium nitride. Alternatively, the layer of an optically highly refractive material can contain, for example, $MnO$, $WO_3$, $Nb_2O_5$, $Bi_2O_3$, $TiO_2$, $Zr_3N_4$, and/or AlN.

The layer thickness of the layer of an optically highly refractive material is preferably from 3.5 nm to 69 nm.

The layer of a dielectric material with a refractive index less than 2.1 preferably has a refractive index n between 1.6 and 2.1, particularly preferably between 1.9 and 2.1.

The layer of a dielectric material preferably contains at least one oxide, for example, tin oxide, and/or a nitride, particularly preferably silicon nitride. The layer of a dielectric material preferably has a layer thickness from 0.3 nm to 63 nm.

The electrically conductive layer preferably contains at least one metal, for example, gold or copper, or an alloy, particularly preferably silver or a silver-containing alloy.

However, the electrically conductive layer can also contain other electrically conductive materials known to the person skilled in the art.

In an advantageous embodiment of the invention, the electrically conductive layer contains at least 90 wt.-% silver, preferably at least 99.9 wt.-% silver. The electrically conductive layer is preferably applied using conventional methods of layer deposition of metals, for example, by vacuum methods such as magnetic field supported cathode sputtering.

The electrically conductive layer preferably has a layer thickness from 8 nm to 25 nm, particularly preferably from 13 nm to 19 nm. This is particularly advantageous with regard to the transparency, the color neutrality, and the sheet resistance of the electrically conductive layer.

The total layer thickness of all the electrically conductive layers is, according to the invention, from 40 nm to 80 nm, particularly preferably from 45 nm to 60 nm. In this range for the total thickness of all electrically conductive layers, with distances h between bus bars typical for motor vehicle windows, in particular windshields, and an operating voltage U in the range from from 12 V to 15 V, an adequately high specific heating output P and, at the same time, an adequately high transmittance are advantageously achieved. In addition, in this range for the total thickness of all the electrically conductive layers, the electrically conductive coating has particularly good reflecting properties for the infrared range. Excessively low total layer thicknesses of all the electrically conductive layers yield an excessively high sheet resistance $R_{square}$ and, thus, an excessively low specific heating output P as well as reduced reflecting properties for the infrared range. Excessively high total layer thicknesses of all the electrically conductive layers reduce the transmittance through the pane too greatly, such that the requirements for the transmittance of motor vehicle windows according to ECE R 43 are not met.

In an advantageous embodiment of the invention, the electrically conductive coating according to the invention includes at least one smoothing layer in at least one of the functional layers. The smoothing layer is arranged below one of the first matching layers, preferably between the anti-reflection layer and the first matching layer at least of one functional layer of the electrically conductive coating according to the invention.

The smoothing layer is preferably in direct contact with the first matching layer. The smoothing layer effects an optimization, in particular smoothing of the surface for an electrically conductive layer subsequently applied above. An electrically conductive layer deposited on a smoother surface has a higher degree of transmittance with a simultaneously lower sheet resistance.

In a particularly preferred embodiment of the invention, each functional layer of the electrically conductive coating includes a smoothing layer, which is arranged below the first matching layer, preferably between the anti-reflection layer and the first matching layer. This is particularly advantageous with regard to the degree of transmittance of the pane according to the invention and the sheet resistance of the electrically conductive coating.

The smoothing layer preferably contains at least one non-crystalline oxide. The oxide can be amorphous or partially amorphous (and thus partially crystalline) but is not completely crystalline. The non-crystalline smoothing layer has low roughness and thus forms an advantageously smooth surface for the layers to be applied above the smoothing layer. The non-crystalline smoothing layer further effects an improved surface structure of the layer deposited directly above the smoothing layer, which is preferably the first matching layer. The smoothing layer can, for example, contain at least one oxide of one or more of the elements tin, silicon, titanium, zirconium, hafnium, zinc, gallium, and indium.

The smoothing layer particularly preferably contains a non-crystalline mixed oxide. The smoothing layer very particularly preferably contains a mixed tin/zinc oxide. The mixed oxide can have dopants. The smoothing layer can, for example, contain an antimony-doped mixed tin/zinc oxide. The mixed oxide preferably has a substoichiometric oxygen content. A method for producing mixed tin/zinc oxide layers by reactive cathode sputtering is known, for example, from DE 198 48 751 C1. The mixed tin/zinc oxide is preferably deposited with a target that contains from 25 wt.-% to 80 wt.-% zinc, from 20 wt.-% to 75 wt.-% tin, and from 0 wt.-% to 10 wt.-% antimony as well as production-related admixtures. The target particularly preferably contains from 45 wt.-% to 75 wt.-% zinc, from 25 wt.-% to 55 wt.-% tin, and from 1 wt.-% to 5 wt.-% antimony as well as production-related admixtures of other metals. The deposition of the mixed tin/zinc oxides takes place under addition of oxygen as reaction gas during the cathode sputtering.

The layer thickness of a smoothing layer is preferably from 3 nm to 20 nm, particularly preferably from 4 nm to 12 nm. The smoothing layer preferably has a refractive index of less than 2.2.

In an advantageous embodiment of the invention, each functional layer includes a second matching layer, which is arranged above the electrically conductive layer. This is particularly advantageous with regard to the sheet resistance of the electrically conductive coating.

The first matching layer and/or the second matching layer preferably contains zinc oxide $ZnO_{1-\delta}$ with $0 \leq \delta \leq 0.01$. The first matching layer and/or the second matching layer preferably further contains dopants. The first matching layer and/or the second matching layer can, for example, contain aluminum-doped zinc oxide. The zinc oxide is preferably deposited substoichiometrically relative to the oxygen to prevent a reaction of excess oxygen with the silver-containing layer. The zinc oxide layer is preferably deposited by magnetic field supported cathode sputtering. The target preferably contains from 85 wt.-% to 100 wt.-% zinc oxide and from 0 wt.-% to 15 wt.-% aluminum as well as production-related admixtures. The target particularly preferably contains from 90 wt.-% to 95 wt.-% zinc oxide and from 5 wt.-% to 10 wt.-% aluminum as well as production-related admixtures. Alternatively, the target preferably contains from 95 wt.-% to 99 wt.-% zinc and from 1 wt.-% to 5 wt.-% aluminum, with the deposition of the layers taking place under addition of oxygen as reaction gas. The layer thicknesses of the first matching layer and of the second matching layer are preferably from 3 nm to 20 nm, particularly preferably from 4 nm to 12 nm.

In a preferred embodiment of the invention, another anti-reflection layer is applied above the uppermost functional layer. The additional anti-reflection layer improves the optical properties of the electrically conductive coating and and also protects the underlying layers against corrosion. In the context of the invention, the uppermost anti-reflection layer is then the anti-reflection layer, which is arranged above the functional layers. In the context of the invention, the lowest anti-reflection layer is the anti-reflection layer that has the least distance from the transparent substrate. The lowest anti-reflection layer is the anti-reflection layer of the lowest functional layer. The uppermost and lowest anti-reflection layers are not arranged between two electrically conductive layers. The uppermost and/or the lowest anti-reflection layer is preferably configured as a layer of an optically highly refractive material with a refractive index greater than or equal to 2.1. The uppermost and/or the lowest anti-reflection layer particularly preferably contains at least one mixed silicon/zirconium nitride, such as an aluminum-doped mixed silicon/zirconium nitride. This is particularly advantageous with regard to the optical properties of the transparent pane according to the invention. The uppermost and/or the lowest anti-reflection layer can, however, also contain a dielectric material with a refractive index less than 2.1, for example, silicon nitride or tin oxide. The uppermost and/or the lowest anti-reflection layer can, for example, also include in each case one layer of an optically highly refractive material and one layer of a dielectric material with a refractive index less than 2.1. The layer thickness of the uppermost and the lowest anti-reflection layer is preferably from 20 nm to 40 nm. Particularly good results are thus obtained.

In an advantageous embodiment of the transparent pane according to the invention, at least one functional layer includes at least one blocker layer. The blocker layer is in direct contact with the electrically conductive layer and is arranged immediately above or immediately below the electrically conductive layer. Thus, no other layer is arranged between the electrically conductive layer and the blocker layer. The functional layer can also include two blocker layers, preferably with one blocker layer arranged immediately above and one blocker layer arranged immediately below the electrically conductive layer. Particularly preferably, each functional layer includes at least one such blocker layer. The blocker layer preferably contains niobium, titanium, nickel, chromium, and/or alloys thereof, particularly preferably nickel-chromium alloys. The layer thickness of the blocker layer is preferably from 0.1 nm to 5 nm, particularly preferably from 0.1 nm to 2 nm. Thus, particularly good results are obtained. A blocker layer immediately below the electrically conductive layer serves, in particular, to stabilize the electrically conductive layer during a temperature treatment and improves the optical quality of the electrically conductive coating. A blocker layer immediately above the electrically conductive layer prevents the contact of the sensitive electrically conductive layer with the oxidizing reactive atmosphere during the deposition of the next layer by reactive cathode sputtering, for example, the second matching layer, which preferably contains zinc oxide.

The transparent substrate preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. Examples of appropriate types of glass are known from DE 697 31 268 T2, page 8, paragraph [0053].

The thickness of the transparent substrate can vary widely and thus be ideally adapted to the requirements of the individual case. Preferably, panes with the standard thicknesses from 1.0 mm to 25 mm and preferably from 1.4 mm to 2.6 mm are used. The size of the transparent substrate can vary widely and is determined by the use according to the invention. The transparent substrate has, for example, in the automotive sector and in the architectural sector, customary areas from 200 $cm^2$ all the way to 4 $m^2$.

The transparent substrate can have any three-dimensional shape. Preferably, the three-dimensional shape has no shadow zones such that it can, for example, be coated by cathode sputtering. The transparent substrate is planar or slightly or greatly curved in one or a plurality of spatial directions. The transparent substrate can be colorless or tinted.

In an advantageous embodiment of the invention, the electrically conductive coating contains two to four, in particular three functional layers. Particularly good results are thus obtained with regard to the sheet resistance of the electrically conductive coating as well as the optical properties and economical production of the transparent pane.

In an advantageous embodiment of the invention, the transparent substrate is bonded via at least one thermoplastic intermediate layer to a second pane to form a composite pane. The electrically conductive coating according to the invention is preferably applied on the surface of the transparent substrate facing the thermoplastic intermediate layer. Thus, the electrically conductive coating is advantageously protected against damage and corrosion.

The composite pane preferably has a total transmittance greater than 70%.

The thermoplastic intermediate layer preferably contains thermoplastic plastics, for example, polyvinyl butyral (PVB), ethylene vinyl acetate (EVA), polyurethane (PU), polyethylene terephthalate (PET), or multiple layers thereof, preferably with thicknesses from 0.3 mm to 0.9 mm.

The second pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The second pane preferably has a thickness from 1.0 mm to 25 mm and particularly preferably from 1.4 mm to 2.6 mm.

The electrically conductive coating preferably extends over the entire surface of the transparent substrate, minus a circumferential frame-like coating-free region with a width from 2 mm to 20 mm, preferably from 5 mm to 10 mm. The coating-free region is preferably hermetically sealed by the thermoplastic intermediate layer or an acrylate adhesive as a vapor diffusion barrier. The corrosion-sensitive electrically conductive coating is protected against moisture and atmospheric oxygen by the vapor diffusion barrier. If the composite pane is provided as a motor vehicle window, for example, as a windshield, and if the electrically conductive coating is used as an electrically heatable coating, the circumferential coating-free region also effects electrical insulation between the voltage-carrying coating and the motor vehicle body.

The transparent substrate can be coating-free in one or a plurality of other regions. Such regions can, for example, serve as data transmission windows or communication windows. In the other coating-free region, the transparent pane is permeable to electromagnetic radiation and, in particular, to infrared radiation.

The electrically conductive coating can be applied directly on the surface of the transparent substrate. Alternatively, the electrically conductive coating can be applied on a carrier film that is embedded between two intermediate layers. The carrier film preferably contains a thermoplastic polymer, in particular polyvinyl butyral (PVB), ethylene vinyl acetate (EVA), polyurethane (PU), polyethylene terephthalate (PET), or combinations thereof.

The transparent substrate can, for example, also be connected to a second pane via spacers to form an insulating glazing unit. The transparent substrate can also be connected to more than one other pane via thermoplastic intermediate layers and/or spacers. If the transparent substrate is connected to one or a plurality of other panes, one or a plurality of these other panes can also have an electrically conductive coating.

In a preferred embodiment, the electrically conductive coating according to the invention is an electrically heatable coating. In that case, the electrically conductive coating is suitably contacted electrically.

In another preferred embodiment, the electrically conductive coating according to the invention is a coating with reflecting properties for the infrared range. For this, the electrically conductive coating need not be electrically contacted. In the context of the invention, "coating with reflecting properties for the infrared range" is understood to mean, in particular, a coating that has a reflectance of at least 20% in the wavelength range from 1000 nm to 1600 nm. Preferably, the electrically conductive coating according to the invention has a reflectance greater than or equal to 50% in the wavelength range from 1000 nm to 1600 nm.

In an advantageous embodiment of the invention, the electrically conductive coating is connected via collecting conductors to a voltage source and a voltage applied on the electrically conductive coating preferably has a value from 12 V to 15 V. The collecting conductors, so-called busbars, serve to transfer electrical power. Examples of suitable busbars are known from DE 103 33 618 B3 and EP 0 025 755 B1.

The busbars are advantageously produced by printing a conductive paste. If the transparent substrate is bent after application of the electrically conductive coating, the conductive paste is preferably baked in before the bending and/or at the time of the bending of the transparent substrate. The conductive paste preferably contains silver particles and glass frits. The layer thickness of the baked-in conductive paste is preferably from 5 µm to 20 µm.

In an alternative embodiment, thin and narrow metal foil strips or metal wires are used as busbars, which preferably contain copper and/or aluminum; in particular, copper foil strips with a thickness of preferably 10 µm to 200 µm, for example, roughly 50 µm, are used. The width of the copper foil strips is preferably 1 mm to 10 mm. The electrical contact between the electrically conductive coating and the busbar can, for example, be produced by soldering or gluing with an electrically conductive adhesive. If the transparent substrate is part of a composite glass, the metal foil strips or metal wires can be placed on the electrically conductive coating during the assembly of the composite layers. In the subsequent autoclave process, a secure electrical contact between the busbars and the coating is achieved through the action of heat and pressure.

In the automotive sector, foil conductors are customarily used as feed lines for contacting busbars in the interior of composite panes. Examples of foil conductors are described in DE 42 35 063 A1, DE 20 2004 019 286 U1, and DE 93 13 394 U1.

Flexible foil conductors, sometimes also called "flat conductors" or "flat-band conductors", are preferably made of a tinned copper strip with a thickness from 0.03 mm to 0.1 mm and a width from 2 mm to 16 mm. Copper has proved successful for such conductor tracks, since it has good electrical conductivity as well as good proccessability into foils. At the same time, material costs are low. Other electrically conductive materials that can be processed into foils can also be used. Examples for this are aluminum, gold, silver, or tin and alloys thereof.

For electrical insulation and for stabilization, the tinned copper strip is applied on a carrier material made of plastic or laminated therewith on both sides. The insulation material contains, as a rule, a 0.025-mm- to 0.05-mm-thick polyimide-based film. Other plastics or materials with the required insulating properties can also be used. A plurality of conductive layers electrically isolated from each other can be situated in one foil conductor strip.

Foil conductors that are suitable for contacting electrically conductive layers in composite panes have a total thickness of only 0.3 mm. Such thin foil conductors can be embedded without difficulty in the thermoplastic intermediate layer between the individual panes.

Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum.

The invention further includes a method for producing a transparent pane with an electrically conductive coating, wherein at least two functional layers are applied one after another on a transparent substrate and for applying each functional layer one after another at least (a) an anti-reflection layer,
(b) a first matching layer, and
(c) an electrically conductive layer are applied, and wherein for applying at least one anti-reflection layer at least one layer of a dielectric material with a refractive index less than 2.1 and
one layer of an optically highly refractive material with a refractive index greater than or equal to 2.1
are applied.

In an advantageous embodiment, a second matching layer is applied after the application of the electrically conductive layer.

In an advantageous embodiment of the invention, a smoothing layer is applied before the application of at least one first matching layer. In another advantageous embodiment of the invention, a blocker layer is applied before or after the application of at least one electrically conductive layer.

In an advantageous embodiment of the invention, another anti-reflection layer is applied after the application of the uppermost functional layer.

The individual layers are deposited by methods known per se, for example, by magnetic field supported cathode sputtering. The cathode sputtering takes place in a protective gas atmosphere, for example, of argon, or in a reactive gas atmosphere, for example, through addition of oxygen or nitrogen.

The layer thicknesses of the individual layers with the desired properties with regard to transmittance, sheet resistance, and color values emerge for the person skilled in the art in a simple manner through simulations in the range of the above indicated layer thicknesses.

In an advantageous embodiment of the invention, the transparent substrate and a second pane are heated to a temperature from 500° C. to 700° C. and the transparent substrate and the second pane are bonded congruently to a thermoplastic intermediate layer. The heating of the pane can take place within a bending process. The electrically conductive coating must, in particular, be suited to withstand the bending process and/or the lamination process without damage. The properties, in particular, the sheet resistance of the above described electrically conductive coating are regularly improved by heating.

The electrically conductive coating can be connected to at least two busbars before the heating of the substrate.

The invention further includes the use of the transparent pane according to the invention as a pane or as a component of a pane, in particular as a component of an insulating glazing unit or a composite pane, in buildings or in means of transportation for travel on land, in the air, or on water, in particular motor vehicles, for example, as a windshield, rear window, side window, and/or roof pane or as a component of a windshield, rear window, side window, and/or roof pane, in particular for heating a window and/or for reducing the heating of an interior space. The pane according to the invention is used, in particular, as a pane with reflecting properties for the infrared range and/or as an electrically heatable pane.

In the following, the invention is explained in detail with reference to drawings and exemplary embodiments. The drawings are a schematic representation and are not true to scale. The drawings in no way restrict the invention.

Figure 2:
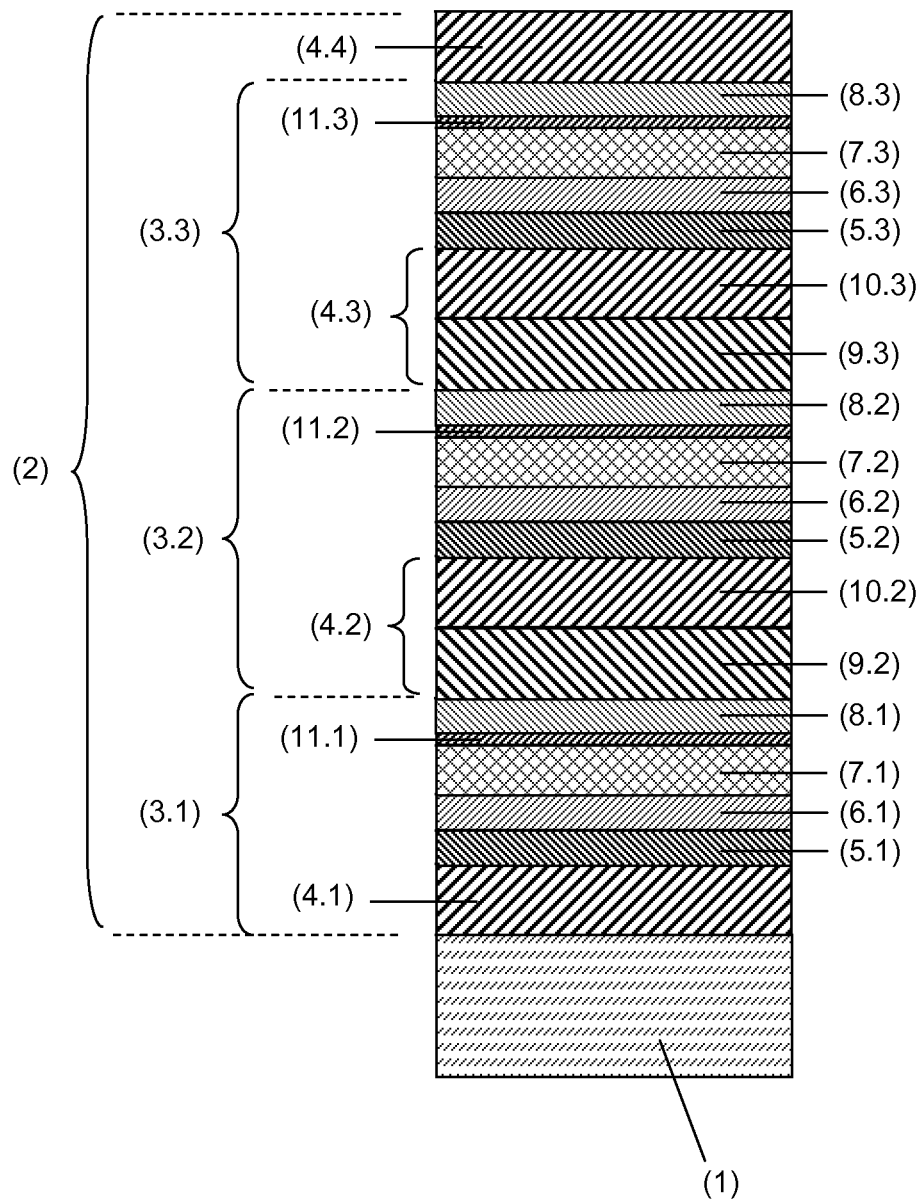
Figure 3:
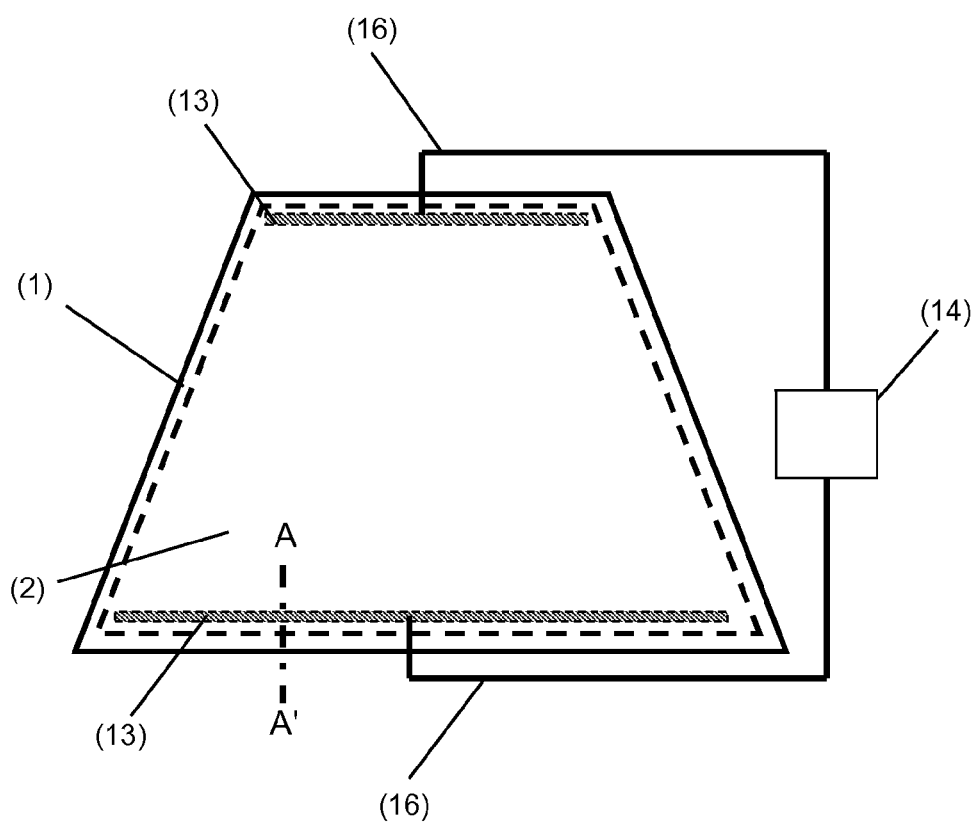
Figure 4:
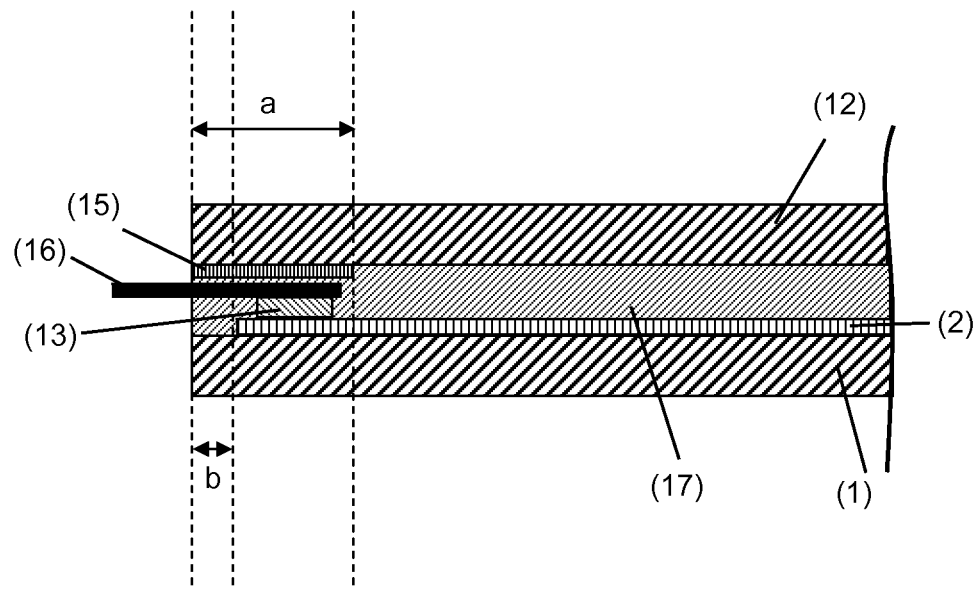
Figure 5:
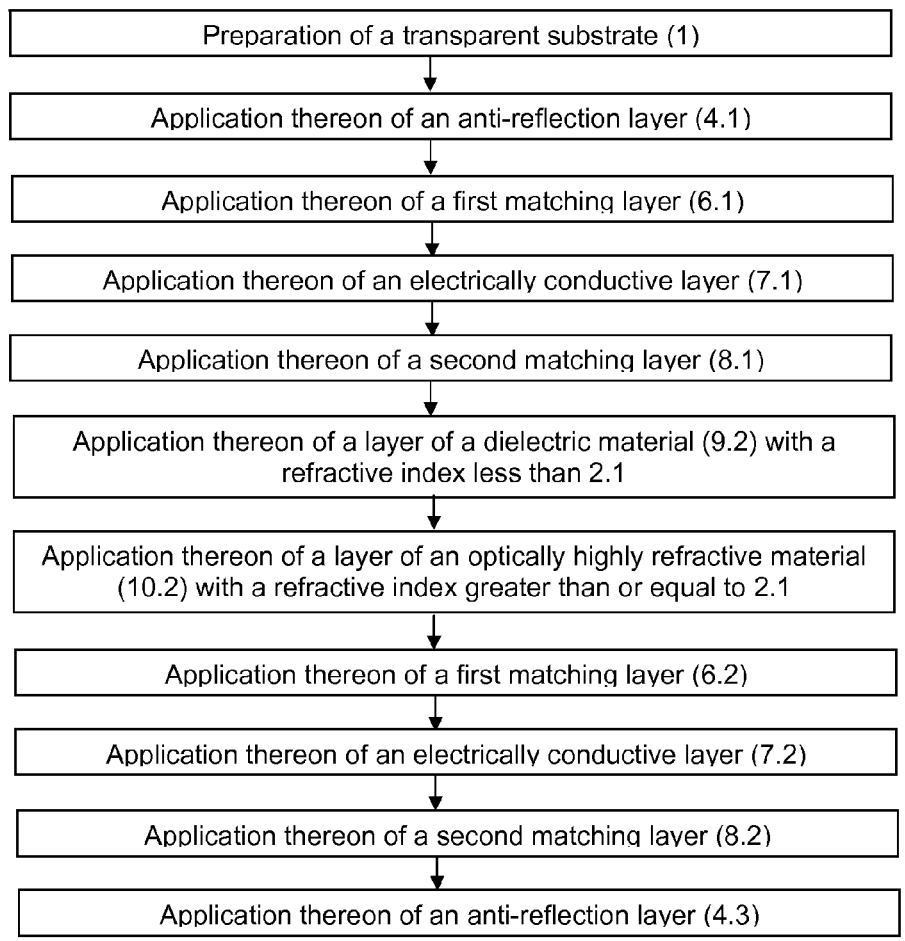

They depict:

FIG. 1 a cross-section through a first embodiment of the transparent pane according to the invention with an electrically conductive coating, FIG. 2 a cross-section through another embodiment of the transparent pane according to the invention with an electrically conductive coating, FIG. 3 a plan view of a transparent pane according to the invention as part of a composite pane, FIG. 4 a cross-section A-A' through the composite pane of FIG. 3, and FIG. 5 a detailed flow chart of an embodiment of the method according to the invention.

FIG. 1 depicts a cross-section through an embodiment of the transparent pane according to the invention with the transparent substrate 1 and the electrically conductive coating 2. The substrate 1 contains float glass and has a thickness of 2.1 mm. The electrically conductive coating 2 comprises two functional layers 3 (3.1 and 3.2), which are arranged congruently one over another. Each functional layer 3 comprises an anti-reflection layer 4 (4.1 and 4.2),
a first matching layer 6 (6.1 and 6.2)
an electrically conductive layer 7 (7.1 and 7.2),
a second matching layer 8 (8.1 and 8.2).

The layers are arranged in the order indicated with increasing distance from the transparent substrate 1. Another anti-reflection layer 4.3 is arranged above the uppermost functional layer 3.2. The first matching layers 6 as well as the second matching layers 8 contain aluminum-doped zinc oxide (ZnO:Al) and have layer thicknesses from 5 nm to 10 nm. The electrically conductive layers 7 contain silver and have layer thicknesses from 15 nm to 16 nm. The lowest anti-reflection layer 4.1 as well as the uppermost anti-reflection layer 4.3 contain aluminum-doped mixed silicon/zirconium nitride ($SiZrN_x$:Al) and have layer thicknesses from 28 nm to 40 nm.

The anti-reflection layer 4.2 is arranged between the electrically conductive layers 7.1 and 7.2. The anti-reflection layer 4.2 comprises one layer of a dielectric material 9.2 with a refractive index less than 2.1 and one layer of an optically highly refractive material 10.2. The layer of a dielectric material 9.2 contains silicon nitride and has a layer thickness of 46 nm. The layer of an optically highly refractive material 10.2 contains aluminum-doped mixed silicon/zirconium nitride ($SiZrN_x$:Al) and has a layer thickness of 23 nm.

By means of the embodiment according to the invention of the anti-reflection layer 4.2 arranged between two electrically conductive layers 7.1, 7.2, a reduction in the sheet resistance of the electrically conductive coating 2 is advantageously achieved.

FIG. 2 depicts a cross-section through another embodiment of the transparent pane according to the invention with the transparent substrate 1 and the electrically conductive coating 2. The substrate 1 contains float glass and has a thickness of 2.1 mm. The electrically conductive coating 2 comprises three functional layers 3 (3.1, 3.2, and 3.3), which are arranged congruently one over another. Each functional layer 3 comprises an anti-reflection layer 4 (4.1, 4.2, and 4.3),
a smoothing layer 5 (5.1, 5.2, and 5.3),
a first matching layer 6 (6.1, 6.2 and 6.3)
an electrically conductive layer 7 (7.1, 7.2, and 7.3),
a blocker layer 11 (11.1, 11.2, and 11.3), and
a second matching layer 8 (8.1, 8.2, and 8.3).

The layers are arranged in the order indicated with increasing distance from the transparent substrate 1. Another anti-reflection layer 4.4 is arranged above the uppermost functional layer 3.3. The smoothing layers 5 contain antimony-doped mixed tin/zinc oxide ($SnZnO_x$:Sb) and have layer thicknesses of 6 nm. The first matching layers 6 as well as the second matching layers 8 contain aluminum-doped zinc oxide (ZnO:Al) and have layer thicknesses from 5 nm to 10 nm. The electrically conductive layers 7 contain silver and have layer thicknesses from 15 nm to 16 nm. The lowest anti-reflection layer 4.1 as well as the uppermost anti-reflection layer 4.4 contain aluminum-doped mixed silicon/zirconium nitride ($SiZrN_x$:Al) and have layer thicknesses from 28 nm to 40 nm.

The anti-reflection layer 4.2 is arranged between the electrically conductive layers 7.1 and 7.2. The anti-reflection layer 4.3 is arranged between the electrically conductive layers 7.2 and 7.3. The anti-reflection layers 4.2 and 4.3 include in each case one layer of a dielectric material 9 (9.2 and 9.3) with a refractive index less than 2.1 and one layer of an optically highly refractive material 10 (10.2 and 10.3). The layers of a dielectric material 9 contain silicon nitride and have layer thicknesses from 39 nm to 42 nm. The layers of an optically highly refractive material 10 contain aluminum-doped mixed silicon/zirconium nitride ($SiZrN_x$:Al) and have layer thicknesses from 20 nm to 21 nm.

The thickness of the layers of an optically highly refractive material 10.2, 10.3 is from 33% to 67% of the thickness of that anti-reflection layer 4.2 or 4.3 that includes the respective layer of an optically highly refractive material 10.2 or 10.3.

The individual layers of the electrically conductive coating 2 were deposited by cathode ray sputtering. The target for the deposition of the matching layers 6, 8 contained 92 wt.-% zinc oxide (ZnO) and 8 wt.-% aluminum. The target for the deposition of the smoothing layers 5 contained 68 wt.-% tin, 30 wt.-% zinc, and 2 wt.-% antimony. The deposition took place under the addition of oxygen as reaction gas during the cathode sputtering. The target for the deposition of the layers of an optically highly refractive material 10 as well as the uppermost and lowest anti-reflection layer 4.1, 4.4 contained 52.9 wt.-% silicon, 43.8 wt.-% zirconium, and 3.3 wt.-% aluminum. The deposition took place under the addition of nitrogen as reaction gas during the cathode sputtering.

By means of the configuration of the anti-reflection layers 4.2, 4.3 arranged between two electrically conductive layers 7, a reduction in the sheet resistance of the electrically conductive coating 2 is achieved. The smoothing layers 5 result in a further reduction of the sheet resistance and an improvement of the transmittance. The blocker layers 11 protect the electrically conductive layers 7 during the deposition of the following layer by reactive cathode sputtering.

FIG. 3 and FIG. 4 each depict a detail of a transparent pane according to the invention as part of a composite pane. The composite pane is provided as a windshield of a passenger car. The transparent substrate 1 is bonded via a thermoplastic intermediate layer 17 to a second pane 12. FIG. 3 depicts a plan view of the surface of the transparent substrate 1 facing away from the thermoplastic intermediate layer. The transparent substrate 1 is the pane facing the interior of the passenger car. The transparent substrate 1 and the second pane 12 contain float glass and have a thickness of 2.1 mm each. The thermoplastic intermediate layer 17 contains polyvinyl butyral (PVB) and has a thickness of 0.76 mm.

An electrically conductive coating 2 is applied on the surface of the transparent substrate 1 facing the thermoplastic intermediate layer 17. The electrically conductive coating 2 is an electrically heatable coating and, for this, is electrically contacted. The electrically conductive coating 2 extends over the entire surface of the transparent substrate 1 minus a circumferential frame-like coating-free region with a width b of 8 mm. The coating-free region serves for electrical insulation between the voltage-carrying electrically conductive coating 2 and the vehicle body. The coating-free region is hermetically sealed by gluing to the intermediate layer 17 in order to protect the electrically conductive coating 2 against damage and corrosion.

A busbar 13 is arranged for the electrical contacting of the electrically conductive coating 2 in each case on the outer upper and lower edge of the transparent substrate 1. The busbars 13 were printed onto the electrically conductive coating 2 using a conductive silver paste and baked in. The layer thickness of the baked-in silver paste is 15 μm. The busbars 13 are connected electrically conductively to the regions of the electrically conductive coating 2 lying thereunder.

The feed lines 16 are made of tinned copper foils with a width of 10 mm and a thickness of 0.3 mm. Each feed line 16 is, in each case, soldered to one of the busbars 13. The electrically conductive coating 2 is connected via the busbars 13 and the feed lines 16 to a voltage source 14. The voltage source 14 is the onboard voltage of 14 V of a motor vehicle.

An opaque color layer with a width a of 20 mm is applied frame-like as a masking print 15 on the second pane 12, on the edge of the surface facing the thermoplastic intermediate layer 17. The masking print 15 conceals from view the strand of adhesive with which the composite pane is bonded into the vehicle body. The masking print 15 serves, at the same time, as protection of the adhesive against UV radiation and thus as protection against premature aging of the adhesive. Moreover, the busbars 13 and the feed lines 16 are concealed by the masking print 15.

FIG. 4 depicts a section along A-A' through the composite pane of FIG. 3 in the region of the lower edge. The transparent substrate 1 with the electrically heatable coating 2, the second pane 12, the thermoplastic intermediate layer 17, a busbar 13, and a feed line 16 as well as the masking print 15 are seen.

FIG. 5 depicts a flowchart of an exemplary embodiment of the method according to the invention for producing a transparent pane with an electrically conductive coating (2).

EXAMPLES

Transparent panes according to the invention with an electrically conductive coating were produced. After the coating of the transparent substrates 1, the sheet resistance of the electrically conductive coating 2 was determined. The transparent substrates 1 provided with the electrically conductive coating 2 were then bent at a temperature of roughly 650° C. The bending process lasted roughly 10 min. Then, each transparent substrate 1 was laminated with a likewise bent second pane 12 via a thermoplastic intermediate layer 17 at a temperature of roughly 140° C. and a pressure of roughly 12 bar. The electrically conductive coating 2 was arranged facing the thermoplastic intermediate layer 17.

The electrically conductive coating 2 included, in each case, three functional layers 3. The exact layer sequence with layer thicknesses and materials of Examples 1 through 3 is presented in Table 1.

In Example 1, the anti-reflection layer 4.2 included one layer of a dielectric material 9.2 with a refractive index less than 2.1 and one layer of an optically highly refractive material 10.2. The thickness of the layer of an optically highly refractive material 10.2 was 33.3% of the thickness of the anti-reflection layer 4.2. The anti-reflection layer 4.3 included only one layer of a dielectric material 9.3. Only the lowest functional layer 3.1 had a smoothing layer 5.1. A blocker layer 11 was arranged above each electrically conductive layer 7.

In Example 2, the anti-reflection layer 4.2 included one layer of a dielectric material 9.2 with a refractive index less than 2.1 and one layer of an optically highly refractive material 10.2. The thickness of the layer of an optically highly refractive material 10.2 was 66.7% of the thickness of the anti-reflection layer 4.2. The anti-reflection layer 4.3 included only one layer of a dielectric material 9.3. Only the lowest functional layer 3.1 had a smoothing layer 5.1. A blocker layer 11 was arranged above each electrically conductive layer 7.

In Example 3, the anti-reflection layer 4.2 included one layer of a dielectric material 9.2 with a refractive index less than 2.1 and one layer of an optically highly refractive material 10.2. The thickness of the layer of an optically highly refractive material 10.2 was 33.3% of the thickness of the anti-reflection layer 4.2. The anti-reflection layer 4.3 also included one layer of a dielectric material 9.3 with a refractive index less than 2.1 and one layer of an optically highly refractive material 10.3. The thickness of the layer of an optically highly refractive material 10.3 was 33.9% of the thickness of the anti-reflection layer 4.3. Each functional layer 3 had a smoothing layer 5. A blocker layer 11 was arranged above each electrically conductive layer 7. The layer structure of the electrically conductive coating 2 of Example 3 corresponds to the layer structure of FIG. 2.

TABLE 1

| Material | Reference character | Layer thickness | | |
| --- | --- | --- | --- | --- |
| | | Example 1 | Example 2 | Example 3 |
| Glass | 12 | 2.1 mm | 2.1 mm | 2.1 mm |
| PVB | 17 | 0.76 mm | 0.76 mm | 0.76 mm |

TABLE 1-continued

| Material | Reference character | | Layer thickness | | |
|---|---|---|---|---|---|
| | | | Example 1 | Example 2 | Example 3 |
| SiZrN$_x$: Al | 4.4 | | 40 nm | 40 nm | 40 nm |
| ZnO: Al | 8.3 | 3.3 | 10 nm | 10 nm | 10 nm |
| NiCr | 11.3 | | 0.3 nm | 0.3 nm | 0.3 nm |
| Ag | 7.3 | | 16 nm | 16 nm | 16 nm |
| ZnO: Al | 6.3 | | 10 nm | 10 nm | 10 nm |
| SnZnO$_x$: Sb | 5.3 | | (none) | (none) | 6 nm |
| SiZrN$_x$: Al | 10.3 | 4.3 | (none) | (none) | 20 nm |
| Si$_3$N$_4$ | 9.3 | | 65 nm | 65 nm | 39 nm |
| ZnO: Al | 8.2 | 3.2 | 10 nm | 10 nm | 10 nm |
| NiCr | 11.2 | | 0.3 nm | 0.3 nm | 0.3 nm |
| Ag | 7.2 | | 16 nm | 16 nm | 16 nm |
| ZnO: Al | 6.2 | | 10 nm | 10 nm | 10 nm |
| SnZnO$_x$: Sb | 5.2 | | (none) | (none) | 6 nm |
| SiZrN$_x$: Al | 10.2 | 4.2 | 23 nm | 46 nm | 21 nm |
| Si$_3$N$_4$ | 9.2 | | 46 nm | 23 nm | 42 nm |
| ZnO: Al | 8.1 | 3.1 | 5 nm | 5 nm | 5 nm |
| NiCr | 11.1 | | 0.3 nm | 0.3 nm | 0.3 nm |
| Ag | 7.1 | | 15 nm | 15 nm | 15 nm |
| ZnO: Al | 6.1 | | 10 nm | 10 nm | 10 nm |
| SnZnO$_x$: Sb | 5.1 | | 6 nm | 6 nm | 6 nm |
| SiZrN$_x$: Al | 4.1 | | 28 nm | 28 nm | 28 nm |
| Glass | 1 | | 2.1 mm | 2.1 mm | 2.1 mm |

The values measured for the sheet resistance $R_{square}$ before and after the temperature treatment are summarized in Table 3.

COMPARATIVE EXAMPLE

The Comparative Example was carried out exactly the same as the Examples. The difference resided in the electrically conductive coating 2. The anti-reflection layers arranged between two electrically conductive layers included, in each case, only one dielectric layer. Such dielectric layers based on silicon nitride are known according to the prior art. For better comparability with Examples 1 through 3 according to the invention, the uppermost and the lowest anti-reflection layer contained aluminum-doped silicon-zirconium-nitride. For better comparability with Examples 1 through 3 according to the invention, a blocker layer containing NiCr was arranged above each electrically conductive layer and the lowest functional layer included a smoothing layer containing antimony-doped mixed tin/zinc oxide. The layer thicknesses of the electrically conductive layers, which contain silver, were selected exactly as in Examples 1 through 3 according to the invention. The exact layer sequence with layer thicknesses and materials of the Comparative Example is presented in Table 2.

The values measured for the sheet resistance $R_{square}$ before and after the temperature treatment are summarized in Table 3.

TABLE 2

| Material | Layer thickness |
|---|---|
| Glass | 2.1 mm |
| PVB | 0.76 mm |
| SiZrN$_x$: Al | 40 nm |
| ZnO: Al | 10 nm |
| NiCr | 0.3 nm |
| Ag | 16 nm |
| ZnO: Al | 10 nm |
| Si$_3$N$_4$ | 65 nm |
| ZnO: Al | 10 nm |
| NiCr | 0.3 nm |
| Ag | 16 nm |
| ZnO: Al | 10 nm |
| Si$_3$N$_4$ | 69 nm |
| ZnO: Al | 5 nm |
| NiCr | 0.3 nm |
| Ag | 15 nm |
| ZnO: Al | 10 nm |
| SnZnO$_x$: Sb | 6 nm |
| SiZrN$_x$: Al | 28 nm |
| Glass | 2.1 mm |

TABLE 3

| | $R_{square}$ [ohm/square] Before Temperature Treatment | $R_{square}$ [ohm/square] After Temperature Treatment and Lamination |
|---|---|---|
| Example 1 | 1.15 | 0.91 |
| Example 2 | 1.16 | 0.90 |
| Example 3 | 1.07 | 0.83 |
| Comparative example | 1.26 | 1.03 |

Example 1 differs from the Comparative Example through the configuration of the anti-reflection layer 4.2 of the second functional layer 3.2. In the Comparative Example, this anti-reflection layer included a silicon nitride-containing layer, whereas the anti-reflection layer 4.2 in Example 1 according to the invention included one layer of a dielectric material 9.2 containing silicon nitride and one layer of an optically highly refractive material 10.2 containing aluminum-doped silicon/zirconium nitride. The thickness of the layer of an optically highly refractive material 10.2 was roughly 33.3% of the thickness of the anti-reflection layer 4.2. In Example 1 according to the invention, the sheet resistance $R_{square}$ of the electrically conductive coating 2 was surprisingly already reduced by 9% before the temperature treatment compared to the Comparative Example. The temperature treatment resulted in a further reduction of the sheet resistance $R_{square}$. After temperature treatment and lamination, the sheet resistance $R_{square}$ of the electrically conductive coating 2 in Example 1 according to the invention was reduced by 12% compared to the Comparative Example.

The embodiment according to the invention at least of one anti-reflection layer resulted, with otherwise identical layer structure of the electrically conductive coating 2, in a reduction of the sheet resistance $R_{square}$. This result was unexpected and surprising for the person skilled in the art.

Example 2 according to the invention differs from Example 1 in that the thickness of the layer of an optically highly refractive material 10 was roughly 66.7% of the thickness of the anti-reflection layer 4.2. Before and after the temperature treatment, values similar to those in Example 1 were observed for the sheet resistance $R_{square}$ of the electrically conductive coating 2. An increase in the fraction of the layer of an optically highly refractive material 10.2 in the anti-reflection layer 4.2 thus did not result in a further substantial reduction of the sheet resistance $R_{square}$. The mere presence of the layer of an optically highly refractive material 10 seems necessary for the reduction of the sheet resistance $R_{square}$ of the electrically conductive coating 2 compared to the Comparative Example. This result was unexpected and surprising for the person skilled in the art.

In Example 3, each anti-reflection layer 4.2, 4.3 arranged between two electrically conductive layers 7 included one layer of a dielectric material 9.2, 9.3 containing silicon nitride and one layer of an optically highly refractive material 10.2, 10.3 containing aluminum-doped silicon/zirconium nitride. The thickness of the layer of an optically highly refractive material 10.2 was roughly 33.3% of the thickness of the anti-reflection layer 4.2. The thickness of the layer of an optically highly refractive material 10.3 was roughly 33.9% of the thickness of the anti-reflection layer 4.3. Moreover, in Example 3, each functional layer 3 includes a smoothing layer 5. In Example 3, the sheet resistance $R_{square}$ of the electrically conductive coating 2 was significantly reduced compared to Examples 1 and 2 as well as to the Comparative Example. Compared to the Comparative Example, the sheet resistance $R_{square}$ was reduced by 15% before the temperature treatment and by 19% after the temperature treatment.

The embodiments according to the invention of the electrically conductive coatings 2 in Examples 1 through 3 resulted in a reduction of the sheet resistance of the conductive coating 2 compared to the Comparative Example according to the prior art. A lower sheet resistance $R_{square}$ results in an improved specific heating output P, which results from $P=U^2/(R_{square}*h^2)$.

The total transmittance through the transparent panes according to the invention was greater than 70% after the temperature treatment. The color values in the L*a*b*-color space were at favorable values. The transparent pane according to the invention meets the legal requirements relative to transmittance and neutral coloration and can be used as motor vehicle glazing.

In further experiments with the electrically conductive coatings 2 according to the invention including three electrically conductive layers 7, it was demonstrated that sheet resistances up to a minimum of roughly 0.4 ohm/square can be achieved with a transmittance through the transparent pane greater than 70%.

LIST OF REFERENCE CHARACTERS (1) transparent substrate
(2) electrically conductive coating
(3) functional layer
(3.1), (3.2), (3.3) first, second, third functional layer
(4) anti-reflection layer
(4.1), (4.2), (4.3), (4.4) first, second, third, fourth anti-reflection layer
(5) smoothing layer
(5.1), (5.2), (5.3) first, second, third smoothing layer
(6) first matching layer
(6.1), (6.2), (6.3) first, second, third first matching layer
(7) electrically conductive layer
(7.1), (7.2), (7.3) first, second, third electrically conductive layer
(8) second matching layer
(8.1), (8.2), (8.3) first, second, third second matching layer
(9) layer of a dielectric material
(9.2), (9.3) first, second layer of a dielectric material
(10) layer of an optically highly refractive material
(10.2), (10.3) first, second layer of an optically highly refractive material
(11) blocker layer
(11.1), (11.2), (11.3) first, second, third blocker layer
(12) second pane
(13) busbar
(14) voltage source
(15) masking print
(16) feed line
(17) thermoplastic intermediate layer
a width of the region masked by (15)
b width of the coating-free region
A-A' section line

The invention claimed is:

1. A transparent pane, comprising:
at least one transparent substrate, and
at least one electrically conductive coating on at least one surface of the transparent substrate,
wherein
the electrically conductive coating has at least two functional layers arranged one above another, and each functional layer comprises at least
one anti-reflection layer,
above the anti-reflection layer, a first matching layer, and
above the first matching layer, an electrically conductive layer, and
at least one anti-reflection layer arranged between two electrically conductive layers comprises at least
one layer of a dielectric material with a refractive index less than 2.1, and
one layer of an optically highly refractive material with a refractive index greater than or equal to 2.1,
wherein a thickness of the layer of an optically highly refractive material is from 10% to 99% of the thickness of the anti-reflection layer that includes the layer of an optically highly refractive material.

2. The transparent pane according to claim 1, wherein the electrically conductive coating is an electrically heatable coating.

3. The transparent pane according to claim 1, wherein the electrically conductive coating is a coating with reflecting properties for the infrared range.

4. The transparent pane according to claim 1, wherein another anti-reflection layer is arranged above an uppermost functional layer.

5. The transparent pane according to claim 4, wherein an uppermost and a lowest anti-reflection layer are configured as layers of an optically highly refractive material with a refractive index greater than or equal to 2.1 and preferably contain at least one mixed silicon/metal nitride, particularly preferably a mixed silicon/zirconium nitride, such as aluminum-doped mixed silicon/zirconium nitride.

6. The transparent pane according to claim 1, wherein the thickness of the layer of an optically highly refractive material is from 25% to 75% of the thickness of the anti-reflection layer that includes the layer of an optically highly refractive material.

7. The transparent pane according to claim 1, wherein each anti-reflection layer arranged between two electrically conductive layers includes at least one layer of a dielectric material with a refractive index less than 2.1 and one layer of an optically highly refractive material with a refractive index greater than or equal to 2.1.

8. The transparent pane according to claim 1, wherein the thickness of the anti-reflection layers arranged between two electrically conductive layers is from 35 nm to 70 nm, preferably from 45 nm to 60 nm.

9. The transparent pane according to claim 1, wherein the layer of an optically highly refractive material contains at least one mixed silicon/metal nitride, particularly preferably a mixed silicon/zirconium nitride, such as aluminum-doped mixed silicon/zirconium nitride.

10. The transparent pane according to claim 1, wherein the layer of a dielectric material contains at least silicon nitride.

11. The transparent pane according to claim 1, wherein each functional layer above the electrically conductive layer includes a second matching layer.

12. The transparent pane according to claim 1, wherein the electrically conductive coating includes at least one smoothing layer that is arranged below one of the first matching layers and wherein, preferably, each functional layer includes a smoothing layer below the first matching layer.

13. The transparent pane according to claim 12, wherein the smoothing layer contains at least one non-crystalline oxide, preferably a non-crystalline mixed oxide, particularly preferably a mixed tin/zinc oxide, such as antimony-doped mixed tin/zinc oxide and preferably has a layer thickness from 3 nm to 20 nm, particularly preferably from 4 nm to 12 nm.

14. The transparent pane according to claim 1, wherein the electrically conductive layer contains at least silver or a silver-containing alloy and preferably has a layer thickness from 8 nm to 25 nm.

15. The transparent pane according to claim 1, wherein the first matching layer and/or the second matching layer contains zinc oxide $ZnO_{1-\delta}$ with $0 \leq \delta \leq 0.01$, such as aluminum-doped zinc oxide and preferably has a thickness from 3 nm to 20 nm, particularly preferably from 4 nm to 12 nm.

16. The transparent pane according to claim 1, wherein at least one functional layer, preferably each functional layer, includes at least one blocker layer, which is arranged immediately above and/or immediately below the electrically conductive layer and which preferably contains at least niobium, titanium, nickel, chromium, or alloys thereof, particularly preferably nickel-chromium alloys, and which preferably has a layer thickness from 0.1 nm to 2 nm.

17. The transparent pane according to claim 1, wherein the electrically conductive coating has a sheet resistance of less than 1 ohm/square, preferably from 0.4 ohm/square to 0.9 ohm/square.

18. The transparent pane according to claim 1, wherein the transparent substrate is bonded to a second pane via at least one thermoplastic intermediate layer to form a composite pane and wherein the total transmittance of the composite pane is preferably greater than 70%.

19. A method for producing the transparent pane with an electrically conductive coating according to claim 1, wherein at least two functional layers are applied one after another on the transparent substrate and for applying each functional layer one after another at least:
 an anti-reflection layer,
 a first matching layer, and
 an electrically conductive layer are applied, and
 wherein for applying at least one anti-reflection layer at least:
  one layer of a dielectric material with a refractive index less than 2.1 and
  one layer of an optically highly refractive material with a refractive index greater than or equal to 2.1 are applied.

20. A method comprising:
 using the transparent pane according to claim 1 as a pane or as a component of a pane, in particular as a component of an insulating glazing unit or a composite pane, in buildings or in means of transportation for travel on land, in the air, or on water, in particular motor vehicles, for example, as a windshield, rear window, side window, and/or roof pane, in particular for heating a window and/or for reducing the heating up of an interior space.

* * * * *

UNITED STATES PATENT AND TRADEMARK OFFICE
CERTIFICATE OF CORRECTION

PATENT NO. : 9,215,760 B2  
APPLICATION NO. : 14/358683  
DATED : December 15, 2015  
INVENTOR(S) : Klaus Fischer et al.

Page 1 of 1

It is certified that error appears in the above-identified patent and that said Letters Patent is hereby corrected as shown below:

IN THE SPECIFICATION

• Column 3, lines 56-57, please delete "particularly preferably preferably from" and replace with "particularly preferably from".

• Column 4, line 37, please delete "at least one one layer" and replace with "at least one layer".

• Column 7, lines 16-17, please delete "conductive coating and and also protects" and replace with "conductive coating and also protects".

• Column 9, line 2, please delete "region also effects electrical insulation" and replace with "region also affects electrical insulation".

Signed and Sealed this  
Fifth Day of April, 2016

Michelle K. Lee  
*Director of the United States Patent and Trademark Office*